(12) United States Patent
Merry et al.

(10) Patent No.: US 12,235,144 B2
(45) Date of Patent: Feb. 25, 2025

(54) MICRO-ELECTROMECHANICAL DEVICE FOR USE IN A FLOW CONTROL APPARATUS

(71) Applicant: APPLIED MATERIALS, INC., Santa Clara, CA (US)

(72) Inventors: Nir Merry, Mountain View, CA (US); Ming Xu, San Jose, CA (US)

(73) Assignee: Applied Materials, Inc.—Robotics, Santa Clara, CA (US)

(*) Notice: Subject to any disclaimer, the term of this patent is extended or adjusted under 35 U.S.C. 154(b) by 237 days.

(21) Appl. No.: 17/475,296

(22) Filed: Sep. 14, 2021

(65) Prior Publication Data

US 2022/0081282 A1    Mar. 17, 2022

Related U.S. Application Data

(60) Provisional application No. 63/079,925, filed on Sep. 17, 2020, provisional application No. 63/079,915, filed on Sep. 17, 2020.

(51) Int. Cl.
*G01F 1/684* (2006.01)
*G01P 5/12* (2006.01)

(52) U.S. Cl.
CPC .............. *G01F 1/6845* (2013.01); *G01P 5/12* (2013.01)

(58) Field of Classification Search
CPC ................. G01P 5/12; G01F 1/68–699
See application file for complete search history.

(56) References Cited

U.S. PATENT DOCUMENTS

| 5,792,952 A  * | 8/1998  | Ritchart   | G01F 1/692    |
|                |         |            | 73/204.27     |
| 5,883,310 A    | 3/1999  | Ho et al.  |               |
| 7,591,193 B2 * | 9/2009  | Snell      | G01P 5/12     |
|                |         |            | 73/861.85     |
| 8,978,462 B2 * | 3/2015  | Pernod     | G01F 1/692    |
|                |         |            | 216/13        |
| 9,500,615 B2 * | 11/2016 | Hultmark   | G01N 27/121   |
| 9,850,573 B1 * | 12/2017 | Sun        | C23C 16/0227  |

(Continued)

FOREIGN PATENT DOCUMENTS

| EP | 2485018 A1 * | 8/2012 | ............. G01F 1/692 |
| JP | S519910 A    | 1/1976 |                          |

(Continued)

OTHER PUBLICATIONS

"Atomic layer deposition of polyimide thin films", Putkonen et al., Journal of Materials Chemistry, 2007, 17, 664-669 (Year: 2006).*

(Continued)

*Primary Examiner* — Justin N Olamit
(74) *Attorney, Agent, or Firm* — Lowenstein Sandler LLP

(57) ABSTRACT

Disclosed herein are embodiments of a sensor device, systems incorporating the same, and methods of fabricating the same. In one embodiment, a sensor device comprises a free-standing sensing element, such as a micro-electromechanical system (MEMS) device. The sensor device further comprises a metallic band to facilitate mounting the MEMS device to a mounting plate. The sensor device further comprises a conformal coating on a least a portion of a sensor region of the sensor device.

20 Claims, 8 Drawing Sheets

(56) References Cited

U.S. PATENT DOCUMENTS

| | | |
|---|---|---|
| 10,288,492 B2 | 5/2019 | Arwatz et al. |
| 10,837,813 B2 | 11/2020 | Arwatz et al. |
| 11,322,364 B2 * | 5/2022 | Joy .................. H01J 37/32449 |
| 2002/0073772 A1 | 6/2002 | Bonne et al. |
| 2007/0044572 A1 | 3/2007 | Davis et al. |
| 2007/0240778 A1 | 10/2007 | L'Bassi et al. |
| 2008/0087102 A1 | 4/2008 | Snell et al. |
| 2008/0167748 A1 | 7/2008 | Ding et al. |
| 2009/0248213 A1 | 10/2009 | Gotoh |
| 2011/0193183 A1 | 8/2011 | Agarwal et al. |
| 2012/0011940 A1 | 1/2012 | Huang et al. |
| 2012/0076935 A1 | 3/2012 | Ding et al. |
| 2012/0116596 A1 * | 5/2012 | Yoneda ................ G05D 7/0635 700/282 |
| 2012/0216888 A1 | 8/2012 | Ding et al. |
| 2014/0116129 A1 | 5/2014 | Yang et al. |
| 2014/0158211 A1 | 6/2014 | Ding et al. |
| 2014/0299204 A1 | 10/2014 | Somani |
| 2014/0327003 A1 | 11/2014 | Fuergut et al. |
| 2015/0075280 A1 | 3/2015 | Hultmark et al. |
| 2015/0260565 A1 | 9/2015 | Smirnov et al. |
| 2016/0124440 A1 | 5/2016 | Takijiri et al. |
| 2016/0202200 A1 | 7/2016 | Nakano et al. |
| 2017/0138799 A1 | 5/2017 | Arwatz et al. |
| 2018/0172491 A1 | 6/2018 | Ding et al. |
| 2018/0188748 A1 | 7/2018 | Xu et al. |
| 2018/0208457 A1 | 7/2018 | Chou et al. |
| 2018/0252559 A1 | 9/2018 | Hultmark et al. |
| 2018/0327325 A1 * | 11/2018 | Gangakhedkar .......... C23C 4/11 |
| 2019/0279888 A1 | 9/2019 | Gopalakrishnan et al. |
| 2019/0381260 A1 | 12/2019 | Hultmark et al. |
| 2020/0081459 A1 | 3/2020 | L'Bassi et al. |
| 2020/0116534 A1 | 4/2020 | Hase et al. |
| 2020/0233006 A1 | 7/2020 | Fan et al. |

FOREIGN PATENT DOCUMENTS

| | | |
|---|---|---|
| JP | S55122135 U | 8/1980 |
| JP | S58132837 U | 9/1983 |
| JP | S60100721 A | 6/1985 |
| JP | H08250465 A | 9/1996 |
| JP | 2003083789 A | 3/2003 |
| JP | 2003121225 A | 4/2003 |
| JP | 2007087294 A | 4/2007 |
| JP | 2009252147 A | 10/2009 |
| JP | 2012513022 A | 6/2012 |
| JP | 2013527436 A | 6/2013 |
| JP | 2015049569 A | 3/2015 |
| JP | 2015194429 A | 11/2015 |
| KR | 20130008767 A | 1/2013 |
| KR | 101250052 B1 | 4/2013 |
| WO | 2004/063679 A1 | 7/2004 |
| WO | 2019/195292 A1 | 10/2019 |

OTHER PUBLICATIONS

International Search Report and Written Opinion of International Application No. PCT/US2021/050728 mailed Dec. 13, 2021, 10 pgs.

International Search Report and Written Opinion of International Application No. PCT/US2021/050730 mailed Feb. 4, 2022, 10 pgs.

International Preliminary Report on Patentability for International Application No. PCT/US2021/050728, mailed Mar. 30, 2023, 9 Pages.

International Preliminary Report on Patentability for International Application No. PCT/US2021/050730, mailed Mar. 30, 2023, 9 Pages.

* cited by examiner

MICRO-ELECTROMECHANICAL DEVICE FOR USE IN A FLOW CONTROL APPARATUS

CROSS-REFERENCE TO RELATED APPLICATION(S)

This application claims the benefit of priority of U.S. Provisional Patent Application No. 63/079,915, filed on Sep. 17, 2020, and of U.S. Provisional Patent Application No. 63/079,925, filed on Sep. 17, 2020, the disclosures of which are hereby incorporated by reference herein in their entireties.

TECHNICAL FIELD

Embodiments of the present disclosure relate, in general, to methods and apparatuses for monitoring and controlling a flow rate of a gas.

BACKGROUND

Controlling a flow rate of a gas presents a common challenge in manufacturing systems. In some manufacturing systems, process gases (i.e., gases used during semiconductor fabrication processes) and/or cleaning gases (i.e., gases used to clean a manufactured device and/or a chamber used in manufacturing an electronic device) may have precise delivery targets including high mass flow rates (i.e., 500 standard liters per minute or more), as well as the ability to precisely control low flow rates (i.e., 10 standard liters per minute or less). Conventional manufacturing systems often use one or more mass flow controllers (MFCs) to measure and control the mass flow rates of process gases.

Each type of MFC (e.g., thermal-based MFCs, pressure-based MFCs, rate-of-decay-based MFCs, etc.) may impose one or more limitations, depending on the application in which the MFC is used. For example, a thermal MFC utilizes a thermal sensor to measure flow and control a needle valve to modulate the flow in the direction of a downstream process chamber. The feedback of such thermal sensors is very slow, resulting in a slow response rate of the MFC (on the order of 100 milliseconds or longer). This renders thermal MFCs impractical for manufacturing applications that have precise gas control and timing requirements.

SUMMARY

Certain embodiments of the present disclosure relate to sensor devices, systems incorporating sensor devices, and methods of adapting sensor devices for use in flow control apparatuses. In one aspect of the present disclosure, a sensor device comprises an elongated support structure, electrodes, and a free-standing sensing element. The elongated support structure comprises an interface region, a sensor region, and a coupling region located between the interface region and the sensor region. The electrodes are disposed on the interface region, and the free-standing sensing element is suspended at the sensor region and electrically coupled to the electrodes. In some embodiments, the sensor device comprises a metallic band encompassing the coupling region. In some embodiments, the sensor device comprises a non-conductive conformal coating on at least a portion of the sensor region. In some embodiments, the sensor device comprises a micro-electromechanical system (MEMS) device.

In another aspect of the present disclosure, a flow control apparatus comprises a gas flow channel defining a gas flow path, a flow modulating valve configured to modulate gas flow in the gas flow channel, a sensor device comprising a free-standing sensing element, and a processing device. In some embodiments, the free-standing sensing element is disposed within the gas flow path. In some embodiments, the processing device is operatively coupled to the flow modulating valve and the sensor device, and is configured to control the flow modulating valve based on signals received from the flow sensor device. In some embodiments, the sensor device comprises a micro-electromechanical system (MEMS) device.

In another aspect of the present disclosure, a method of adapting a flow sensor device for use in a gas flow channel comprises providing a sensor device, depositing a conformal coating on the sensor device to at least partially coat a sensor region of the sensor device, and depositing a metallic band on the sensor device to encompass a coupling region of the sensor device. In some embodiments, the sensor device comprises an elongated support structure comprising an interface region, the sensor region, and the coupling region located between the interface region and the sensor region.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
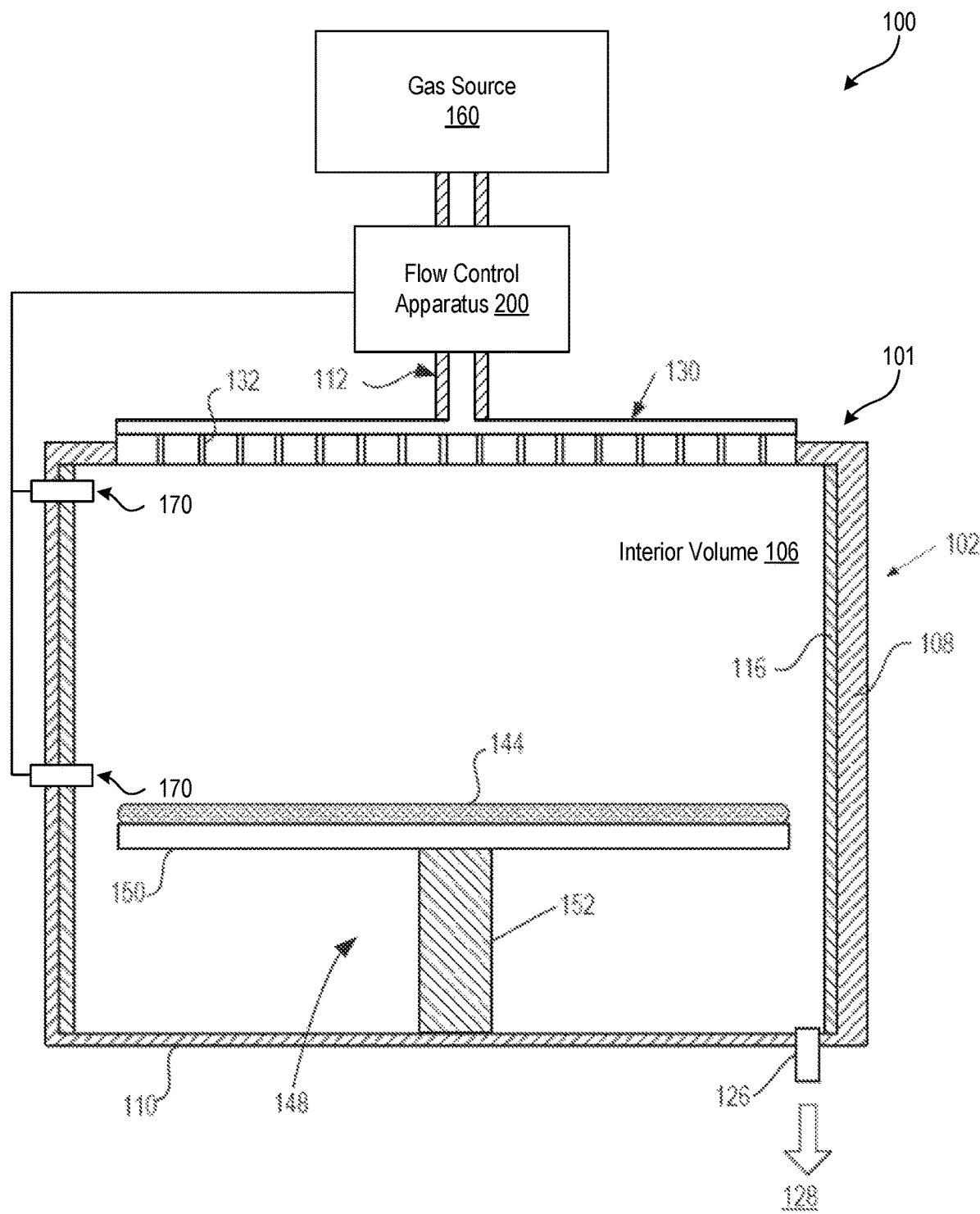
FIG. 1 illustrates an exemplary system that includes a processing chamber, a gas source, and a flow control apparatus in accordance with embodiments of the present disclosure.

Embodiments described herein relate to a sensor device adapted for used in a mass flow control apparatus, a system incorporating the same, and a method of adapting the sensor device for such use. The sensor device includes, in some embodiments, a MEMS device having a free-standing sensing element that is to be disposed directly in the flow path of the gas flow channel. The MEMS device has formed thereon a conformal coating to protect the MEMS device from corrosive gases, and a metal band to allow for a metal seal to be formed between the MEMS device and a mounting plate or other device or structure to which the MEMS device is to be mounted.

In general, it is advantageous to precisely control the flow rate of a process gas used in a manufacturing process to better control the process and to allow precise processing constraints to be met. The low transient response rates of current MFCs, which are generally on the order of 100 milliseconds or greater, are unsuitable for applications that entail precise control of gas dosing, such as the delivery of small quantities of gas as well as pulses of one or more gases in succession having pulse widths on the order of 100 milliseconds or less.

Embodiments of the present disclosure advantageously overcome the limitations of current MFCs by utilizing a MEMS device directly within the flow path of the gas to provide fast (i.e., transient response of less than about 1 millisecond) and accurate flow feedback. A processing device, such as an EtherCAT® plug-in module (EPM), operatively coupled to the MEMS device can more quickly control an MFC or a standalone actuatable valve based on the fast flow feedback as compared to traditional MFCs. While various embodiments may utilize MEMS devices as the sole source of feedback, flow feedback from an MFC device may also be advantageously used together with the MEMS feedback, for example, for the purposes of calibration or verification (e.g., to ensure consistency between the measured signals).

In addition to flow feedback, the MEMS device may be advantageously utilized to provide fast and accurate temperature measurements at any location of a gas supply line, including at the source, near the valve, near an entrance to a process chamber (i.e., the point of delivery), or within the process chamber. The temperature measurements may be monitored in real-time by the processing device, which may in turn transmit power output commands to heating units at different locations of the gas supply line.

Certain embodiments advantageously adapt the MEMS devices to be inserted directly into a gas flow path while protecting the MEMS devices from the corrosive effects of the gases. For example, in some embodiments, a protective and non-conductive conformal coating is deposited onto surfaces of the MEMS device that are exposed to gases during operation. For example, atomic layer deposition (ALD) or ion assisted deposition (LAD) techniques may be utilized to form conformal coatings on at least portions of the MEMS device. The ALD technique, for example, enables a conformal coating of substantially uniform thickness and zero porosity (i.e., porosity-free) on all exposed surfaces of the component to be coated, including features having complex geometries and/or high aspect ratios. The coating may be plasma resistant to reduce plasma interactions and improve the durability of the MEMS device without impacting its performance. A thin coating deposited with ALD may maintain the electrical properties and relative shape and geometric configuration of the MEMS device so as to not disturb its functionality. LAD-deposited coatings may have a relatively low film stress (e.g., as compared to a film stress caused by plasma spraying or sputtering). The IAD-deposited coating may additionally have a porosity that is less than 1%, and less than about 0.1% in some embodiments. Post coating heat treatment can be used to achieve improved coating properties. For example, it can be used to convert an amorphous coating to a crystalline coating with higher erosion resistance. Another example is to improve the coating to substrate bonding strength by formation of a reaction zone or transition layer therebetween.

Certain embodiments also advantageously allow for the MEMS device to be mounted in a manner that avoids the use of adhesive compounds. For example, in certain embodiments, the MEMS device may be modified to include a metallic band that encompasses a region of the MEMS device between a sensor region and an interface region to which electrical contact is made, with the metallic band being electrically isolated from the other conductive components of the MEMS device by the conformal coating formed on the MEMS device. The MEMS device can then be mounted to a metallic mounting plate via brazing to form a metal seal between the metallic band of the MEMS device and the mounting plate.

Several embodiments herein are discussed with respect to MFCs or components thereof used for restricting the flow rate of a gas used in a manufacturing system. However, it should be understood that the embodiments described herein also apply to other purposes outside of manufacturing, such as building ventilation systems and ventilators for medical use.

FIG. 1 depicts a system 100 that includes a processing chamber 101, a gas source 160, and a flow control apparatus 200 in accordance with embodiments of the present disclosure. The processing chamber 101 may be used for processes in which a corrosive plasma environment is provided. For example, the processing chamber 101 may be a chamber for a plasma etcher or plasma etch reactor, a plasma cleaner, and so forth. In alternative embodiments other processing chambers may be used, which may or may not be exposed to a corrosive plasma environment. Some examples of chamber components include a chemical vapor deposition (CVD) chamber, a physical vapor deposition (PVD) chamber, an ALD chamber, an LAD chamber, an etch chamber, and other types of processing chambers. In some embodiments, processing chamber 101 may be any chamber used in an electronic device manufacturing system.

In one embodiment, the processing chamber 101 includes a chamber body 102 and a showerhead 130 that encloses an interior volume 106. The showerhead 130 may include a showerhead base and a showerhead gas distribution plate. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel, or other suitable material such as titanium. The chamber body 102 generally includes sidewalls 108 and a bottom 110.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 101.

The gas source 160 may be coupled to the processing chamber 101 to provide process and/or cleaning gases via supply line 112 to the interior volume 106 through a showerhead 130. The flow control apparatus 200 may be coupled to the gas source 160 and processing chamber 101. The flow control apparatus 200 may be used to measure and control the flow of gas from the gas source 160 to interior volume 106. An exemplary flow control apparatus 200 is described in greater detail below with respect to FIG. 2. In some embodiments, one or more gas panels 160 may be coupled to processing chamber 101 to provide gases to the interior volume 106. In such embodiments, one or more flow control apparatuses 200 may be coupled to each gas source 160 and processing chamber 101. In other embodiments, a single flow control apparatus 200 may be coupled to one or more gas panels 160. In some embodiments, the flow control apparatus 200 may comprise a flow ratio controller to control the flow of gases to the processing chamber 101 (e.g., through one or more supply lines 112), or to other processing chambers.

The showerhead 130 may be supported on the sidewall 108 of the chamber body 102. The showerhead 130 (or lid) may be opened to allow access to the interior volume 106 of the processing chamber 101, and may provide a seal for the processing chamber 101 while closed. The gas source 160 may be coupled to the processing chamber 101 to provide process and/or cleaning gases to the interior volume 106 through the showerhead 130 or lid and nozzle (e.g., through apertures of the showerhead or lid and nozzle). Showerhead 130 may be used for processing chambers used for dielectric etch (etching of dielectric materials). The showerhead 130 may include a gas distribution plate (GDP) and may have multiple gas delivery holes 132 (also referred to as channels) throughout the GDP. The showerhead 130 may be formed by metal or alloy plate with the protection by a multi-layer protective coating as described herein. The metal or alloy plate may be composed of aluminum, an aluminum alloy, or another metal or metal alloy. The showerhead 130 may be formed with the GDP bonded to an aluminum base or an anodized aluminum base. The GDP may be made from Si or SiC, or may be a ceramic such as $Y_2O_3$, $Al_2O_3$, $Y_3Al_5O_{12}$ (YAG), and so forth.

For processing chambers used for etching of conductive materials, a lid may be used rather than a showerhead. The lid may include a center nozzle that fits into a center hole of the lid. The lid may be a ceramic such as $Al_2O_3$, $Y_2O_3$, YAG, or a ceramic compound including $Y_4Al_2O_9$ and a solid-solution of $Y_2O_3$—$ZrO_2$. The nozzle may also be a ceramic, such as $Y_2O_3$, YAG, or a ceramic compound including $Y_4Al_2O_9$ and a solid-solution of $Y_2O_3$—$ZrO_2$.

Examples of processing gases that may be used to process substrates in the processing chamber 101 include halogen-containing gases, such as $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$, and $SiF_4$, among others, and other gases such as $O_2$ or $N_2O$. Flow rates of any of these gases may be measured and regulated by the flow control apparatus 200. A remote plasma may be formed from any of these and/or other processing gases and then delivered through supply line 112, through the flow control apparatus 200, to the chamber 101. Accordingly, the remote plasma may be composed of $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases).

A substrate support assembly 148 is disposed in the interior volume 106 of the processing chamber 101 below the showerhead 130. The substrate support assembly 148 holds a substrate 144 during processing. A ring (e.g., a single ring) may cover a portion of the electrostatic chuck 150, and may protect the covered portion from exposure to plasma during processing. The ring may be silicon or quartz in one embodiment. An inner liner may be coated on the periphery of the substrate support assembly 148. The inner liner may be a halogen-containing gas resistant material, such as $Al_2O_3$, $Y_2O_3$, YAG, a ceramic compound including $Y_4Al_2O_9$ and a solid-solution of $Y_2O_3$—$ZrO_2$, other rare earth-containing or non-rare earth-containing ceramic materials, or combinations thereof. In one embodiment, the inner liner may be fabricated from the same materials of the outer liner 116. In some embodiments, In some embodiments, one or more sensor devices 170 may be disposed within the interior volume 106. For example, one or more sensor devices 170 may be located near (e.g., within 10 centimeters of) the showerhead 130. As another example, one or more sensor devices may be located near (e.g., within 10 centimeters of) the substrate 144, which may be used to monitor conditions near the reaction site.

In one embodiment, the substrate support assembly 148 includes a pedestal 152 that supports an electrostatic chuck 150. The electrostatic chuck 150 further includes a thermally conductive base and an electrostatic puck bonded to the thermally conductive base by a bond, which may be a silicone bond in one embodiment. The thermally conductive base and/or electrostatic puck of the electrostatic chuck 150 may include one or more optional embedded heating elements, embedded thermal isolators, and/or conduits to control a lateral temperature profile of the substrate support assembly 148. The electrostatic puck may further include multiple gas passages such as grooves, mesas, and other surface features that may be formed in an upper surface of the electrostatic puck. The gas passages may be fluidly coupled to a source of a heat transfer (or backside) gas such as helium via holes drilled in the electrostatic puck. In operation, the backside gas may be provided at controlled pressure into the gas passages to enhance the heat transfer between the electrostatic puck and a supported substrate 144. The electrostatic chuck 150 may include at least one clamping electrode controlled by a chucking power source.

Figure 2:
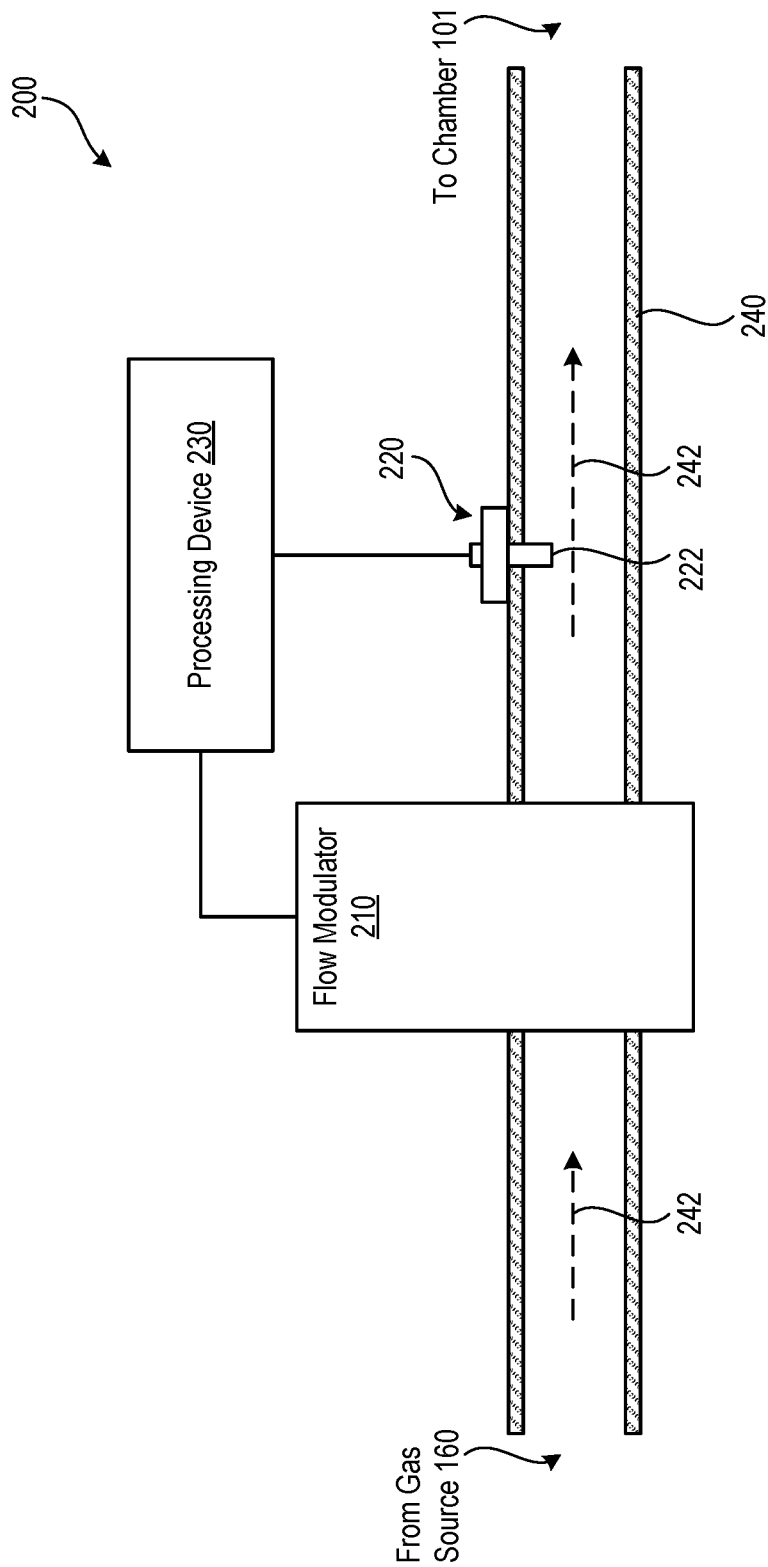
FIG. 2 illustrates an exemplary flow control apparatus in accordance with embodiments of the present disclosure.

FIG. 2 depicts the flow control apparatus 200 in accordance with embodiments of the present disclosure. The flow control apparatus 200 may be configured to measure and control a mass flow rate of a process gas and/or a cleaning gas used in a manufacturing system, and thus may be considered a type of MFC. The flow control apparatus 200 may be coupled to the gas source 160 and the chamber 101 via a gas flow channel 240. The gas flow channel may correspond to the supply line 112 of FIG. 1. In some embodiments, the flow control apparatus 200 may be incorporated into a flow ratio controller or a pulsed mass flow system.

In some embodiments, flow control apparatus 200 may include at least a flow modulator 210, a sensor device 220, and a processing device 230. Gas from the gas source 160 flows through the flow path 242 defined through gas flow channel 240 through the flow modulator 210, and to the chamber 101. In other embodiments, the gas flow channel 240 may terminate somewhere other than at the chamber 101. For example, the gas flow channel 240 may deliver gas to an open environment (e.g., an exhaust system) or a closed environment (e.g., a building or vehicle ventilation system).

In some embodiments, the flow modulator 210 is configured to restrict the gas flow through the flow path 242, and may comprise one or more flow modulating valves which may each be an actuatable valve such as, for example, a solenoid valve or a piezoelectric valve. In some embodiments, the flow modulator includes other components in addition to a valve, such as flow or temperature sensing components. In some embodiments, the flow modulator 210 functions as an MFC, such as a thermal-based MFC, a pressure-based MFC, or a rate-of-decay-based MFC.

In some embodiments where the flow modulator 210 functions as a thermal-based MFC, the flow modulator 210 includes a capillary bypass channel that branches off from the gas flow channel 240. Temperature sensors at the beginning and end of the capillary are used to compute (e.g., by the processing device 230 or an on-board processing device) a temperature delta, which is proportional to the gas flow rate.

In some embodiments where the flow modulator 210 functions as a pressure-based MFC, the flow modulator 210 includes two pressure transducers upstream and downstream from the flow modulating valve and a temperature sensor. The gas flow rate is proportional to the product of the temperature and the difference of the squares of the upstream and downstream pressures.

In some embodiments where the flow modulator 210 functions as a rate-of-decay-based MFC, the flow modulator 210 includes valves for controlling gas flow into a reservoir of a predetermined volume, and a pressure sensor for measuring the decaying pressure in the reservoir. The gas flow rate is proportional to the rate of change in pressure.

In some embodiments, the sensor device 220 is disposed downstream from the flow modulator 210. The sensor device 220 may be a part of the flow modulator 210 (e.g., adjacent to the flow modulating valve of the flow modulator 210), near (e.g., within 10 centimeters of) the flow modulator 210, near (e.g., within 10 centimeters of) an inlet of the chamber 101 or the showerhead 130, or within the chamber 101 (as illustrated in FIG. 1 with respect to sensor devices 170, which may be the same or similar to the sensor device 220).

In some embodiments, the sensor device 220 comprises a MEMS device 222, which may be configured to generate one or more signals responsive to conditions of the gas flow. For example, the MEMS device 222 may be configured to generate one or more signals indicative of a gas temperature or a gas flow rate. An exemplary MEMS device is described in greater detail below with respect to FIG. 3. In some embodiments, the sensor device 220 is mounted to the gas flow channel 240 such that the MEMS device 222 is inserted directly into the flow path 242. The sensor device 220 is coupled to the gas flow channel such that a seal is formed to prevent gas leakage. In some embodiments, the sensor device 220 includes a mounting plate to which the MEMS device 222 secured via a seal (e.g., a metal seal).

In some embodiments, the processing device 230 includes a central processing unit (CPU), microcontroller, a programmable logic controller (PLC), a system on a chip (SoC), a server computer, or other suitable type of computing device. The processing device 230 may be configured to execute programming instructions related to the operation of the flow modulator 210. The processing device 230 receives feedback signals from the sensor device 220 and, optionally, the flow modulator 210, and computes temperature, flow rate, and/or other parameters of the gas flow. The processing device 230 further transmits control signals to the flow modulator 210 based on the received feedback signals. In some embodiments, the processing device 230 is configured for high-speed feedback processing, and may include, for example, an EPM. In some embodiments, the processing device is configured to execute a process recipe, or one or more steps of a process recipe, for a fabrication process using the chamber 101. For example, the recipe may specify gas flows at particular flow rates to occur at specific times, for specific durations, and for specific gases. As another example, the recipe may specify pulses of one or more gases.

Figure 3A:
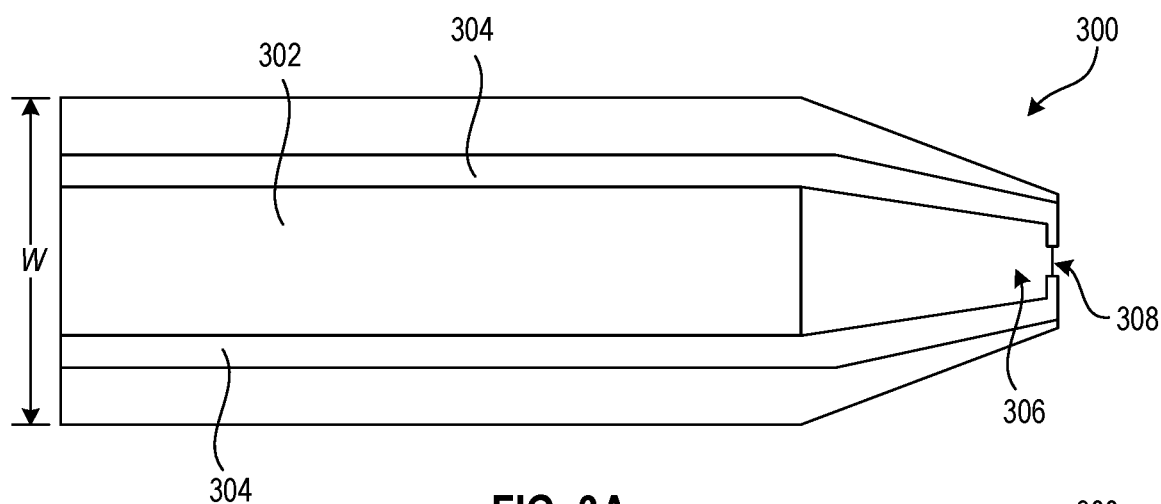
FIG. 3A illustrates a top view of an exemplary MEMS device in accordance with embodiments of the present disclosure.
Figure 3B:
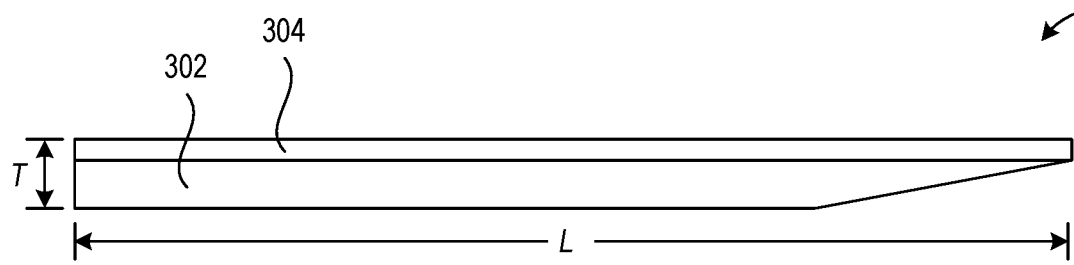
FIG. 3B illustrates a side view of the exemplary MEMS device in accordance with embodiments of the present disclosure.

FIGS. 3A and 3B illustrate a top view and side view, respectively, of an exemplary MEMS device 300 in accordance with embodiments of the present disclosure, which may be manufactured using semiconductor manufacturing techniques that would be familiar to one of ordinary skill in the art. The MEMS device 300 may be the same as or similar to the MEMS device 222 described with respect to FIG. 2. The overall dimensions of the MEMS device 300 may be characterized by a length (L) from about 2 mm to about 10 mm, a width (W) from about 1 mm to about 5 mm, and a thickness (T) of about 0.1 mm to about 1 mm. The MEMS device 300 includes an elongated support structure 302 having a substantially planar shape. The elongated support structure 302 may be formed from an insulating material or semiconductor, such as silicon, silicon having one or more oxide layers formed thereon, or any other suitable material. The elongated support structure 302 may have a tapered shape that may improve its aerodynamic properties. The tapered region may further define a cavity 306 across which a free-standing sensing element is suspended, such as a nanowire 308.

Electrodes 304 are illustrated as being disposed on a surface of the elongated support structure 302, which extend from a flat end of the elongated support structure 302 to the nanowire 308. The electrodes 304 may be formed from one or more conductive metals. The electrodes may serve as electrical contacts to which one or more devices may be operatively coupled (e.g., the processing device 230). In some embodiments, a portion of the electrodes 304 may be encapsulated or formed through an interior of the elongated support structure 302 to protect the electrodes 304 from corrosion.

Figure 3C:
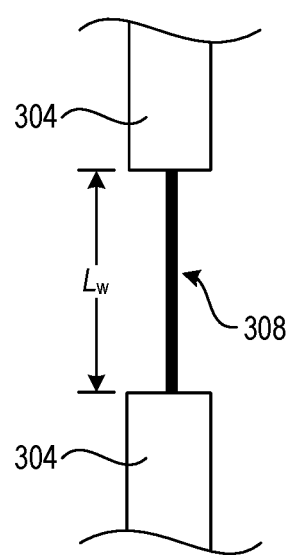
FIG. 3C illustrates a free-standing sensing element of the exemplary MEMS device in accordance with embodiments of the present disclosure.

FIG. 3C illustrates a magnified view of a nanowire 308 suspended between the two electrodes 304. As used herein, the term "nanowire" refers to a conductive body having at least two dimensions of less than 1 micrometer. In some embodiments, the nanowire 308 is formed from the same conductive material as the electrodes 304, such as platinum. For example, the nanowire 308 may be formed by depositing a metal (e.g., platinum) onto the elongated support structure 302 and selectively etching the elongated support structure 302, resulting in the free-standing nanowire 308 suspended across the cavity 306. In some embodiments, the nanowire 308 may be a single continuous filament, but may also be formed from nanoparticles or nanotubes arranged to form a conductive route. Other continuous or non-continuous structures may be utilized provided that these structures allow for an impedance to be measured across the wire.

The nanowire 308 is produced to have a length ($L_w$) longer than its diameter or width/thickness, with its dimensions being selected such that the nanowire 308 can be deflected when exposed to both low and high velocity gas flows. In some embodiments, $L_W$ is less than 1 millimeter in length, for example, from about 1 micrometer to about 500 micrometers, or from about 10 micrometers to about 200 micrometers. In some embodiments, $L_W$ is about 10 to about 100,000 times greater than its diameter or width/thickness. In some embodiments, the nanowire 308 may have a circular or rectangular cross-section having a diameter or thickness/width of about 50 nanometers to about 500 nanometers. One of ordinary skill in the art will recognize that other dimensions may be utilized.

In some embodiments, the MEMS device 300 may be configured to provide multiple sensor modes with different sensitivities along different dimensions. For example, the MEMS device 300 may be configured for constant current anemometry (CCA), where a fixed current is passed through the nanowire 308 to raise the temperature of the nanowire 308 causing an increase in resistance. During operation, gas flow over the wire removes heat from the nanowire 308 via convection, and the resistance at constant current and constant gas velocity will reach a steady state. Increases or decreases in the gas velocity will result in decreases or increases, respectively, in resistance of the nanowire 308, allowing a measured voltage output to be correlated to the gas flow rate.

As another example, the MEMS device 300 may be configured for elastic filament velocimetry (EFV). Gas velocity may be correlated to strain in the nanowire 308 due to deflection by the gas flow. In this operation, a small current may pass through the nanowire 308 that results in negligible heating. During operation, the gas flow deflects the nanowire 308, causing an internal stress that changes the resistance of the nanowire 308. The change in resistance can be correlated to the gas flow rate.

In some embodiments, the nanowire 308 may be combined on the MEMS device 300 with two or more nanowires having separate pairs of electrodes, which may each be used to separately perform CCA or EFV. In some embodiments, the two or more nanowires may be oriented in a non-collinear orientation.

Figure 4A:
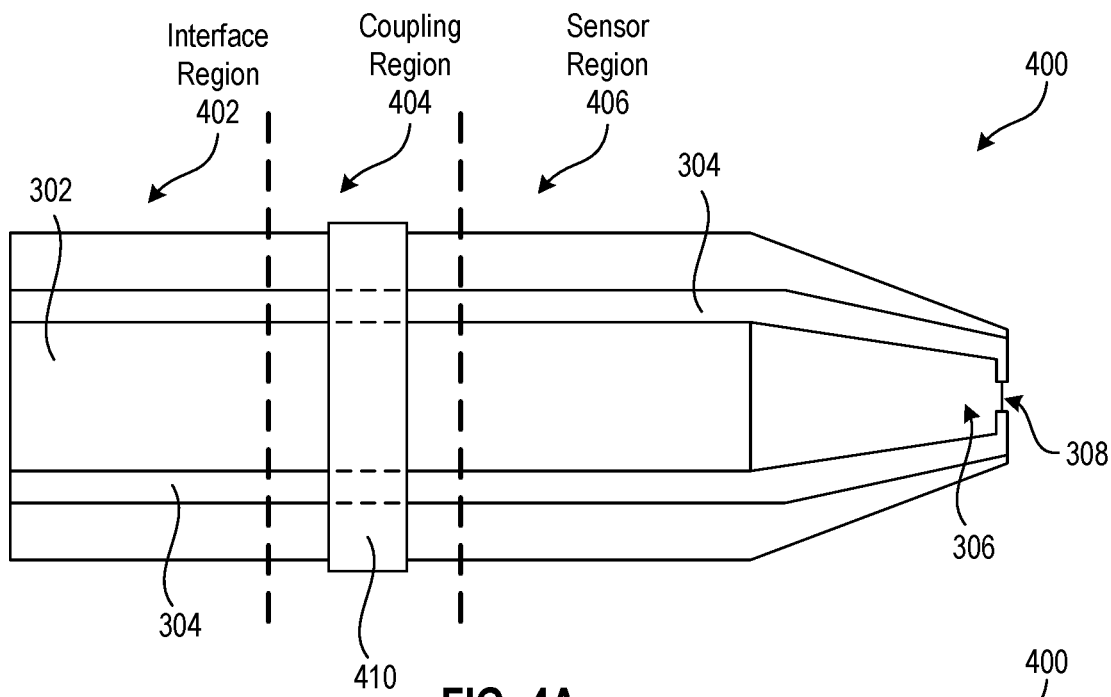
FIG. 4A illustrates a top view of an exemplary MEMS device adapted for use in a flow control apparatus in accordance with embodiments of the present disclosure.

FIGS. 4A and AB illustrate a top view and side view, respectively, of an exemplary MEMS device 400 adapted for use in a flow control apparatus (e.g., the flow control apparatus 200) in accordance with embodiments of the present disclosure. The MEMS device 400 corresponds to a modified version of the MEMS device 300, which includes a metallic band 410, and may also include a non-conductive conformal coating 420 (as described below with respect to FIG. 4C). The elongated support structure 302 includes three regions. The first region is an interface region 402 for coupling the MEMS device 400 to an external device, such as the processing device 230. The electrodes 304 may serve as electrical contacts for interfacing with such external devices, forming a closed circuit during operation.

The second region is a coupling region 404 that serves as a location at which the MEMS device 400 can be coupled or mounted to another structure, such as a mounting plate. The metallic band 410 is located at the coupling region, which is disposed substantially at a central location of the elongated support structure 302. In some embodiments, the metallic band 410 is located at another suitable location of the elongated support structure 302, provided that the metallic band 410 does not overlap the cavity 306 or block electrical coupling to the electrodes 304.

Figure 4B:
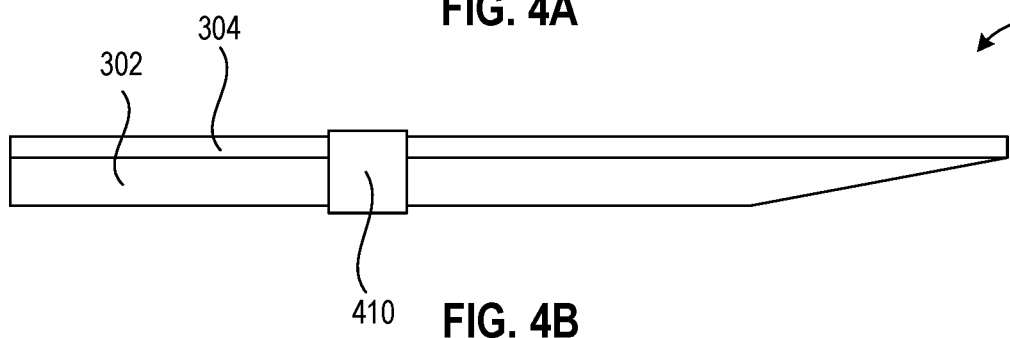
FIG. 4B illustrates a side view of the exemplary MEMS device adapted for use in a flow control apparatus in accordance with embodiments of the present disclosure.

In some embodiments, the metallic band 410 is formed from nickel, aluminum, another non-corrosive metal, or alloys thereof. In some embodiments, the metallic band 410 may be deposited using, for example, a technique such as physical vapor deposition (PVD) or electroplating, to deposit a continuous conformal layer that encompasses a portion of the elongated support structure 302. A conformal layer that covers multiple surfaces of the elongated support structure 302 is illustrated in FIGS. 4A and 4B. In FIG. 4A, the dotted lines passing through the metallic band 410 are shown to indicate that the electrodes 304 are disposed below the metallic band 410. In some embodiments, an insulating layer (e.g., $SiO_2$) is deposited prior to the metallic band 410 to separate the metallic band 410 from the elongated support structure 302 and the electrodes 304, so as to avoid causing a short between the electrodes 304 during operation. In some embodiments, a thickness of the metallic band 410 is from 50 micrometers to 500 micrometers. In some embodiments, a width of the metallic band (i.e., a width measured along a longitudinal axis of the elongated support structure 302) is from 0.5 millimeters to 2 millimeters. In some embodiments, the metallic band 410 does not form a continuous layer, and may be deposited as discrete islands of metal material, for example.

In some embodiments, the MEMS device 400 further includes a non-conductive conformal coating 420 on one or more surfaces or portions thereof of the interface region 402, the coupling region 404, and/or the sensor region 406. In some embodiments, the conformal coating 420 covers some or all of the sensor region 406, including some or all of the nanowire 308. In other embodiments, the conformal coating 420 covers the sensor region 406 without covering the nanowire 308. In other embodiments, the conformal coating 420 covers only portions of the MEMS device 400 that are exposed to a gas flow when the MEMS device 400 is inserted into a gas flow channel, as discussed below with respect to FIGS. 5A-5G.

In some embodiments, the conformal coating 420 covers at least a portion of the coupling region 404 and/or the interface region 402. In some embodiments, the metallic band 410 is disposed above the conformal coating 420, with the conformal coating 420 acting as an insulating layer between the metallic band 410 and the electrodes 304. In such embodiments, the conformal coating 420 is deposited prior to depositing the metallic band 410.

Figure 4C:
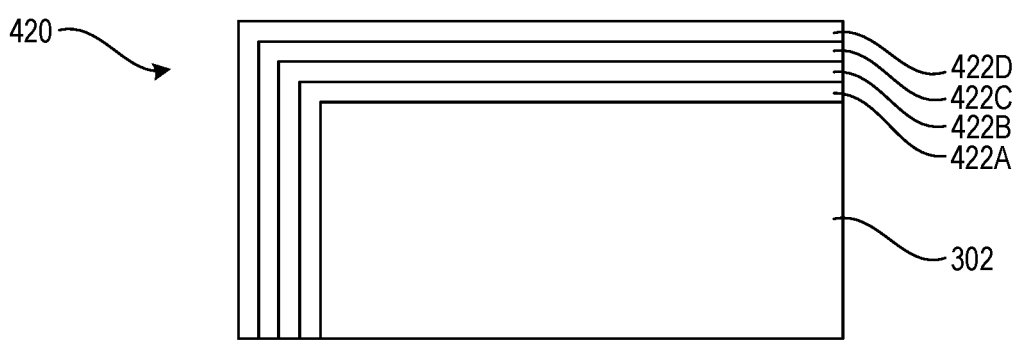
FIG. 4C illustrates a cross-sectional view of a conformal coating formed on surfaces of an exemplary MEMS device in accordance with embodiments of the present disclosure.

FIG. 4C illustrates a cross-sectional view of a magnified region of the MEMS device 400 to illustrate the conformal coating 420 on multiple surfaces of the elongated support structure 302. In some embodiments, the conformal coating 420 is deposited using, for example, a technique such as ALD, LAD, low pressure plasma spray (LPPS), chemical vapor deposition (CVD), plasma spray chemical vapor deposition (PS-CVD), sputtering, combinations thereof, or other techniques or modifications thereof suitable for forming conformal coatings. In some embodiments, the conformal coating 420 comprises a ceramic material that is resistant to corrosion by process gases or reactive species. For example, in some embodiments, the conformal coating may comprise a plasma-resistant ceramic coating comprising a rare-earth ceramic selected from $Y_2O_3$, YZrO, $Y_xZr_yO_z$, YZrOF, $Y_3Al_5O_{12}$, $Y_4Al_2O_9$, $YF_3$, $Y_xO_yF$, YOF, $Er_2O_3$, $Er_3Al_5O_{12}$, $ErF_3$, $E_xO_yF_z$, ErOF, $La_2O_3$, $Lu_2O_3$, $Sc_2O_3$, $ScF_3$, ScOF, $Gd_2O_3$, $Sm_2O_3$, $Dy_2O_3$, a $Y_2O_3$—$ZrO_2$ solid solution, a ceramic comprising $Y_2Al_4O_9$ and a $Y_2O_3$—$ZrO_2$ solid solution, or combinations thereof. In some embodiments, the conformal coating 420 is substantially uniform, conformal, and porosity-free.

As illustrated in FIG. 4C, in some embodiments, the conformal coating 420 includes multiple layers 422A-422D that are deposited in succession. In some embodiments, more or few layers than show may be present, and a number of layers may range from 1 layer to 100 layers, up to 500 layers, or more. For example, multiple atomically-thin or near atomically-thin layers may be deposited, for example, using ALD. In some embodiments, the compositions of each of the layers 422A-422D may alternate. In some embodiments, a total thickness of the conformal coating 420 may range from 10 nanometers to 300 nanometers.

Figure 5A:
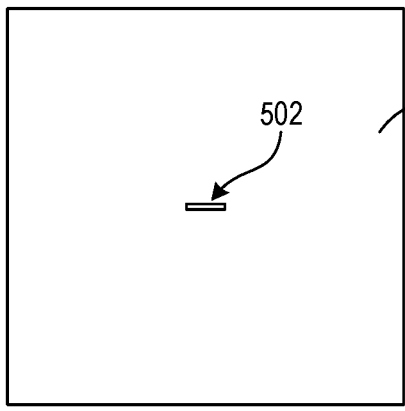
FIG. 5A illustrates a top view of an exemplary mounting plate in accordance with embodiments of the present disclosure.
Figure 5B:
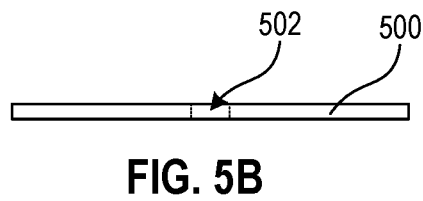
FIG. 5B illustrates a side cross-sectional view of the exemplary mounting plate in accordance with embodiments of the present disclosure.
Figure 5C:
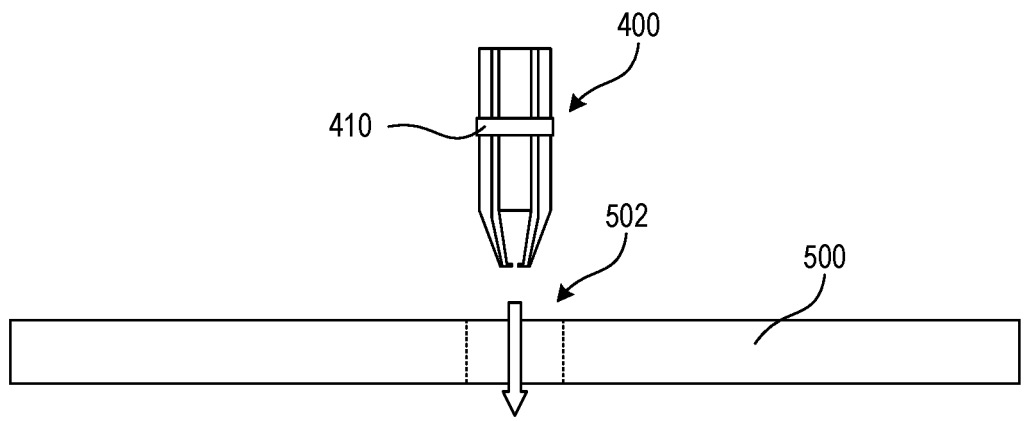
FIG. 5C illustrates an exemplary MEMS device prior to insertion through a slot of an exemplary mounting plate in accordance with embodiments of the present disclosure.
Figure 5D:
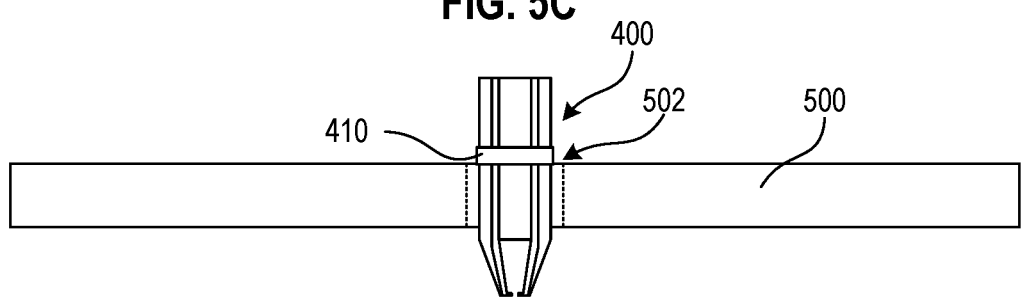
FIG. 5D illustrates the exemplary MEMS device inserted into the slot of the exemplary mounting plate in accordance with embodiments of the present disclosure.
Figure 5E:
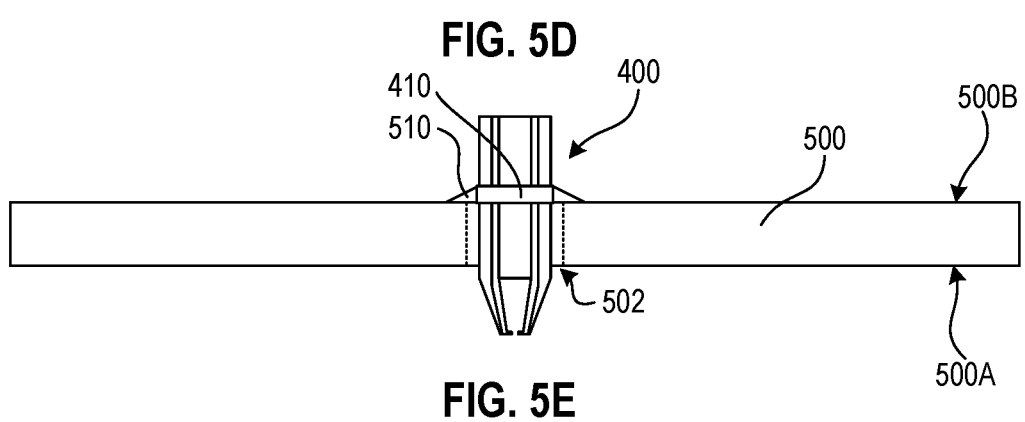
FIG. 5E illustrates the exemplary MEMS device mounted within the slot of the exemplary mounting plate by a metal seal in accordance with embodiments of the present disclosure.

FIGS. 5A-5E illustrate mounting of the MEMS device 400 to an exemplary mounting plate 500 in accordance with embodiments of the present disclosure. The mounting plate 500 may be in a form of a thin, flat metallic sheet, though other suitable shapes are contemplated, such as round, rectangular, etc. In some embodiments a thickness of the mounting plate may range from 500 micrometers to 5 millimeters. The mounting plate 500 may be formed from, for example, stainless steel, a nickel alloy (e.g., Hastelloy® C-276 alloy, which is an alloy of nickel, molybdenum, and chromium), or another suitable material. The mounting plate 500 includes a slot 502 formed therethrough shaped for receiving the MEMS device 400. In some embodiments, the slot 502 is sized so as not to physically contact the MEMS device 400 (or at least portions of the MEMS device 400). The MEMS device 400 may be inserted into the slot 502, as illustrated in FIGS. 5C and 5D, and then mounted to a mounting surface 500B of the mounting plate 500, for example, by a seal 510 formed between the metallic band 410 and the mounting plate 500. The seal 510 is an air-tight seal to prevent gas leakage when the mounting plate 500 and MEMS device 400 assembly is further coupled to a gas flow channel, such as the gas flow channel 520. In some embodiments, the seal 510 is a metal seal formed, for example, by brazing or soldering.

Figure 5F:
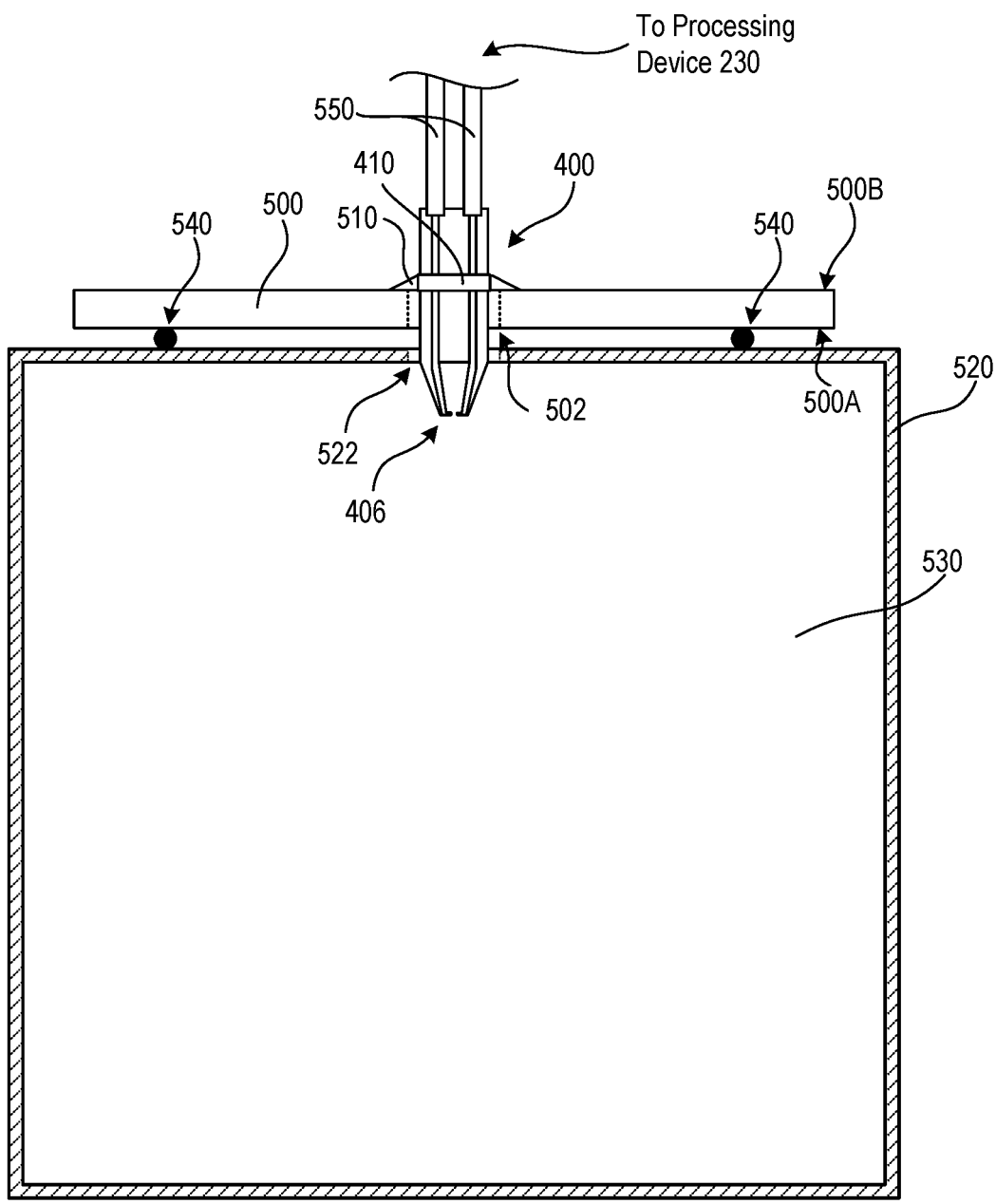
FIG. 5F illustrates the exemplary MEMS device coupled to a gas flow channel via the exemplary mounting plate in accordance with embodiments of the present disclosure.

FIG. 5F illustrates a cross-sectional view of the mounting plate 500 and MEMS device 400 assembly coupled to the gas flow channel 520, which may be similar to the configuration illustrated in FIG. 2 with the sensor device 220 coupled to the gas flow channel 240. In some embodiments, the gas flow channel 520 is a gas line, an offshoot channel of a gas line, or a separate component with inlets and outlets fitted to the gas line. In some embodiments, the mounting plate is integrally formed with the gas flow channel 520. In some embodiments, the mounting plate 500 is mechanically coupled to the gas flow channel.

When the mounting plate 500 is coupled to the gas flow channel 520, the MEMS device 400 is inserted through a slot 522 of the gas flow channel 520 such that the nanowire 308 is disposed within a flow path 530 of the gas flow channel 520 (which is in a direction orthogonal to the plane of the drawing). When the mounting plate 500 is in the form of planar structure, as illustrated, a rubber o-ring 540 may be disposed between a gas-facing surface 500A of the mounting plate 500 and the gas flow channel 520 to form a seal. Leads 550 may be, for example, mechanically coupled to or soldered to the electrodes 304 of the MEMS device 400 to operatively couple the MEMS device 400 to, for example, the processing device 230.

Figure 6:
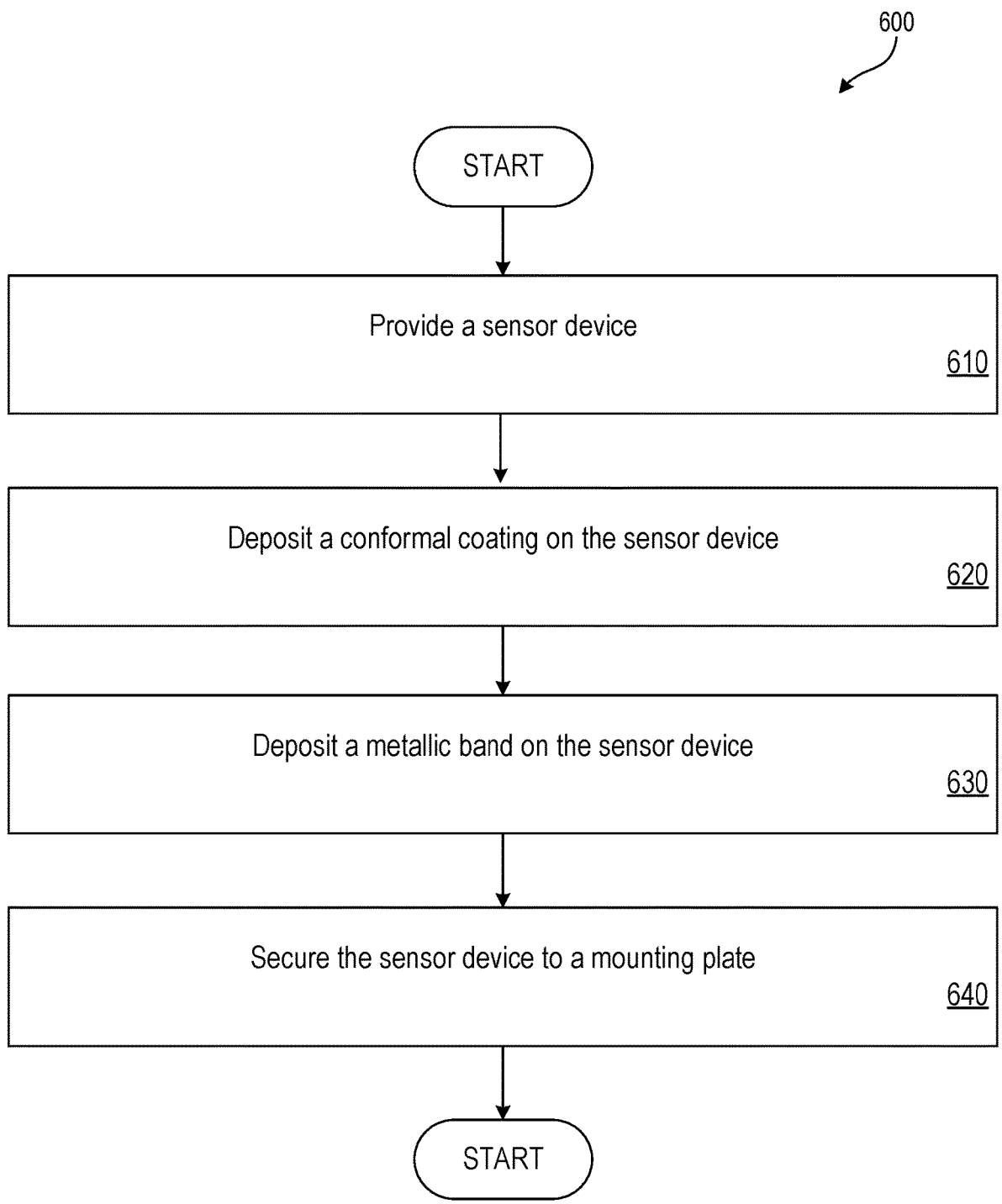
FIG. 6 illustrates a method of adapting a sensor device for use in a flow control apparatus in accordance with embodiments of the present disclosure.

FIG. 6 illustrates a method 600 of adapting a sensor device for use in a flow control apparatus in accordance with embodiments of the present disclosure. At block 610, a sensor device is provided, such as sensor device 220 described above with respect to FIG. 2. In some embodiments, the sensor device comprises a MEMS device, such as the MEMS devices 222 or 300 described with respect to FIGS. 2-5. In some embodiments, the sensor device comprises an elongated support structure comprising an interface region (e.g., the interface region 402), a sensor region (e.g., the sensor region 406), and a coupling region (e.g., the coupling region 404) located between the interface region and the sensor region. The sensor region may include a free-standing sensing element suspended at the sensor region, such as a nanowire (e.g., the nanowire 308).

At block 620, a conformal coating (e.g., the conformal coating 420) is deposited onto the sensor device to at least partially coat the sensor region. In some embodiments, the conformal coating is a non-conductive material, such as a non-conductive ceramic material. In some embodiments, the conformal coating covers at least a portion of the nanowire (e.g., the nanowire 308). In other embodiments, the conformal coating covers the sensor region and does not coat, or minimally coats, the nanowire.

In some embodiments, the conformal coating is deposited using one or more of ALD, IAD, LPPS, CVD, PS-CVD, or sputtering. In some embodiments, the conformal coating comprises a rare-earth ceramic selected from $Y_2O_3$, YZrO, $Y_xZr_yO_z$, $Y_xZrOF$, $Y_3Al_5O_{12}$, $Y_4Al_2O_9$, $YF_3$, $Y_xO_yF_z$, YOF, $Er_2O_3$, $Er_3Al_5O_{12}$, $ErF_3$, $E_xO_yF_z$, ErOF, $La_2O_3$, $Lu_2O_3$, $Sc_2O_3$, $ScF_3$, ScOF, $Gd_2O_3$, $Sm_2O_3$, $Dy_2O_3$, a $Y_2O_3$—$ZrO_2$ solid solution, a ceramic comprising $Y_2Al_4O_9$ and a $Y_2O_3$—$ZrO_2$ solid solution, or combinations thereof. In some embodiments, the conformal coating comprises multiple layers. In some embodiments, the conformal coating has a thickness of about 10 nanometers to about 300 nanometers.

At block 630, a metallic band (e.g., the metallic band 410) is deposited on the sensor device (i.e., on the MEMS device). In some embodiments, the metallic band is deposited using one or more of PVD or electroplating. In some embodiments, the metallic band forms a continuous conformal layer that encompasses a portion of the elongated support structure. In some embodiments, the metallic band is deposited over the conformal coating. In other embodiments, the conformal coating is not present at the location at which the metallic band is deposited or otherwise formed.

At block 640, the sensor device is secured to a mounting plate (e.g., the mounting plate 500). In some embodiments, the sensor device is secured to the mounting plate by forming a metal seal (e.g., the seal 510) between the metallic band and the mounting plate, for example, by brazing or soldering. In some embodiments, the sensor device is inserted into a gas flow channel and the mounting plate is mechanically coupled to the gas flow channel (as illustrated in FIG. 5F).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

Figure 7:
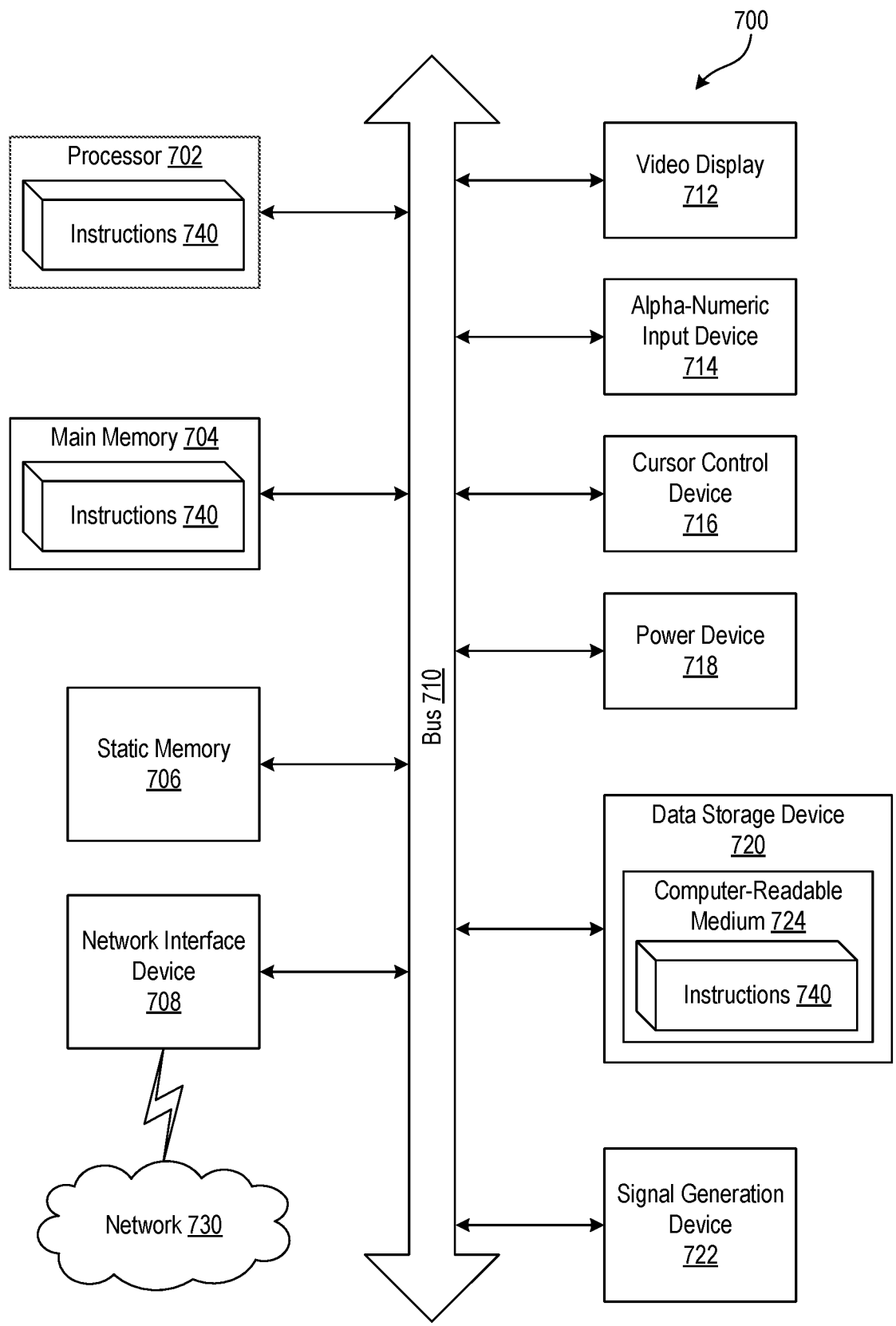
FIG. 7 is a block diagram illustrating a computer system for use in accordance with the embodiments of the present disclosure.

FIG. 7 illustrates a diagrammatic representation of a machine in the exemplary form of a computer system 700 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a PDA, a cellular telephone, a web appliance, a server, a network router, switch or bridge, or any machine capable of executing a set of instructions (sequentially or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 700 may be utilized by or illustrative of any of the electronic components described herein (e.g., the processing device 230 or any electronic components utilized in connection with the operation of the chamber 101 or the flow modulator 210).

The exemplary computer system 700 includes a processing device (processor) 702, a main memory 704 (e.g., ROM, flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 720, which communicate with each other via a bus 710.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 740 for performing the operations discussed herein.

The computer system 700 may further include a network interface device 708. The computer system 700 also may include a video display unit 712 (e.g., a liquid crystal display (LCD), a cathode ray tube (CRT), or a touch screen), an alphanumeric input device 714 (e.g., a keyboard), a cursor control device 716 (e.g., a mouse), and a signal generation device 722 (e.g., a speaker).

Power device 718 may monitor a power level of a battery used to power the computer system 700 or one or more of its components. The power device 718 may provide one or more interfaces to provide an indication of a power level, a time window remaining prior to shutdown of computer system 700 or one or more of its components, a power consumption rate, an indicator of whether computer system is utilizing an external power source or battery power, and other power related information. In some implementations, indications related to the power device 718 may be accessible remotely (e.g., accessible to a remote back-up management module via a network connection). In some implementations, a battery utilized by the power device 718 may be an uninterruptable power supply (UPS) local to or remote from computer system 700. In such implementations, the power device 718 may provide information about a power level of the UPS.

The data storage device 720 may include a computer-readable storage medium 724 (e.g., a non-transitory computer-readable storage medium) on which is stored one or more sets of instructions 740 (e.g., software) embodying any one or more of the methodologies or functions described herein. These instructions 740 may also reside, completely or at least partially, within the main memory 704 and/or within the processor 702 during execution thereof by the computer system 700, the main memory 704, and the processor 702 also constituting computer-readable storage media. The instructions 740 may further be transmitted or received over a network 730 (e.g., the network 14) via the network interface device 708. While the computer-readable storage medium 724 is shown in an exemplary implementation to be a single medium, it is to be understood that the computer-readable storage medium 724 may include a single medium or multiple media (e.g., a centralized or distributed database, and/or associated caches and servers) that store the one or more sets of instructions 740.

In the foregoing description, numerous details are set forth. It will be apparent, however, to one of ordinary skill in the art having the benefit of this disclosure, that the present disclosure may be practiced without these specific details. While specific embodiments have been described herein, it should be understood that they have been presented by way of example only, and not limitation. The breadth and scope of the present application should not be limited by any of the embodiments described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

References were made to the accompanying drawings, which form a part of the description and in which are shown, by way of illustration, specific embodiments. Although these disclosed embodiments are described in sufficient detail to enable one skilled in the art to practice the embodiments, it is to be understood that these examples are not limiting, such that other embodiments may be used and changes may be made to the disclosed embodiments without departing from their spirit and scope. For example, the blocks of the methods shown and described herein are not necessarily performed in the order indicated in some other embodiments. Additionally, in some other embodiments, the disclosed methods may include more or fewer blocks than are described. As another example, some blocks described herein as separate blocks may be combined in some other embodiments. Conversely, what may be described herein as a single block may be implemented in multiple blocks in some other embodiments. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion. When the term "about" or "approximately" is used herein, this is intended to mean that the nominal value presented is precise within ±10%.

In addition, the articles "a" and "an" as used herein and in the appended claims should generally be construed to mean "one or more" unless specified otherwise or clear from context to be directed to a singular form. Reference throughout this specification to "an embodiment," "one embodiment," "some embodiments," or "certain embodiments" indicates that a particular feature, structure, or characteristic described in connection with the embodiment is included in at least one embodiment. Thus, the appearances of the phrase "an embodiment," "one embodiment," "some embodiments," or "certain embodiments" in various locations throughout this specification are not necessarily all referring to the same embodiment.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "processing," "reprocessing," "adding," "subtracting," "multiplying," "dividing," "optimizing," "calibrating," "detecting," "performing," "analyzing," "determining," "enabling," "identifying," "modifying," "transforming," "applying," "causing," "storing" "comparing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A sensor device comprising:
   an elongated support structure comprising an interface region, a sensor region, and a coupling region located between the interface region and the sensor region, wherein the elongated support structure is composed of a material that is not brazable;
   electrodes disposed on the interface region;
   a free-standing sensing element suspended at the sensor region, wherein the free-standing sensing element is electrically coupled to the electrodes;
   a conformal band-shaped metallic coating encompassing the coupling region, wherein the conformal band-shaped metallic coating is sealed against the coupling region of the elongated support structure, and wherein the conformal band-shaped metallic coating is brazable and enables brazing of the elongated support structure to a mounting plate to form a metal seal between the sensor device and the mounting plate; and
   a non-conductive conformal coating on at least a portion of the sensor region, the non-conductive conformal coating comprising a plasma-resistant ceramic material.

2. The sensor device of claim 1, wherein the sensor device comprises a silicon-based micro-electromechanical system (MEMS) device.

3. The sensor device of claim 1, wherein the non-conductive conformal coating has a thickness of about 10 nanometers to about 300 nanometers.

4. The sensor device of claim 1, wherein the free-standing sensing element comprises a nanowire, and wherein the sensor region defines a cavity across which the nanowire is suspended.

5. The sensor device of claim 4, wherein the nanowire comprises platinum, and wherein the nanowire is at least partially coated by the non-conductive conformal coating.

6. The sensor device of claim 1, wherein the electrodes are formed on or within the coupling region, and wherein the non-conductive conformal coating forms an insulating layer between the conformal band-shaped metallic coating and the electrodes.

7. The sensor device of claim 1, wherein the mounting plate further comprises:
   a gas-facing surface and a mounting surface opposite the gas-facing surface, the mounting plate having a slot formed therethrough, wherein:
      the elongated support structure is disposed in the slot such that the sensor region extends from the gas-facing surface and the coupling region extends from the mounting surface, and
      the elongated support structure is secured to the mounting plate at the coupling region by a metal seal formed between the conformal band-shaped metallic coating and the mounting surface of the mounting plate.

8. The sensor device of claim 1, wherein the conformal band-shaped metallic coating has a thickness from 50 micrometers to 500 micrometers and a width from 0.5 millimeters to 2 millimeters.

9. A flow control apparatus comprising:
   a gas flow channel defining a gas flow path;
   a flow modulating valve configured to modulate gas flow in the gas flow channel;
   a sensor device, comprising:
      an elongated support structure, wherein the elongated support structure is composed of a material that is not brazable;

a sensing region on the elongated support structure, the sensing region comprising a non-conductive conformal plasma-resistant ceramic coating and a free-standing sensing element disposed within the gas flow path; and a coupling region on the elongated support structure, the coupling region comprising a conformal band-shaped metallic coating that seals the sensor device to the gas flow channel, wherein the conformal band-shaped metallic coating is sealed against the coupling region, and wherein the conformal band-shaped metallic coating is brazable and enables brazing of the elongated support structure to a mounting plate or an exterior region of the gas flow channel to form a metal seal between the sensor device and the mounting plate or the exterior region of the gas flow channel; and a processing device operatively coupled to the flow modulating valve and the sensor device, the processing device being configured to adjust the flow modulating valve based on signals received from the sensor device.

10. The flow control apparatus of claim 9, wherein the sensor device is a silicon-based micro-electromechanical system (MEMS) device.

11. The flow control apparatus of claim 9, wherein the free-standing sensing element comprises a nanowire.

12. The flow control apparatus of claim 9, wherein the free-standing sensing element is at least partially coated by the non-conductive conformal plasma-resistant ceramic coating.

13. The flow control apparatus of claim 9, wherein the elongated support structure is disposed within a slot formed in the gas flow path.

14. The flow control apparatus of claim 13, wherein the coupling region corresponds to a portion of the elongated support structure that extends out of the slot of the gas flow path, wherein the sensor device is secured to the gas flow path by the mounting plate that is mechanically coupled to the gas flow path.

15. The flow control apparatus of claim 13, wherein the coupling region corresponds to a portion of the elongated support structure that extends out of the slot of the gas flow channel, wherein the sensor device is secured to the gas flow path by the exterior region of the gas flow channel.

16. A method of adapting a sensor device for use in a flow control apparatus, the method comprising:
providing the sensor device comprising:
an elongated support structure comprising an interface region, a sensor region, and a coupling region located between the interface region and the sensor region, wherein the elongated support structure is composed of a material that is not brazable; and
a free-standing sensing element suspended at the sensor region;
depositing a conformal coating on the sensor device to at least partially coat the sensor region, the conformal coating comprising a plasma-resistant ceramic material; and
depositing a conformal band-shaped metallic coating on the sensor device to encompass the coupling region, wherein the conformal band-shaped metallic coating is sealed against the coupling region of an elongated support structure, and wherein the conformal band-shaped metallic coating is brazable and enables brazing of the elongated support structure to a mounting plate to form a metal seal between the sensor device and the mounting plate.

17. The method of claim 16, wherein the conformal coating is deposited using an ion assisted deposition process, and wherein the plasma-resistant ceramic material is non-conductive.

18. The method of claim 16, further comprising:
securing the sensor device to the mounting plate by forming the metal seal between the conformal band-shaped metallic coating and the mounting plate.

19. The method of claim 18, wherein the metal seal is formed by brazing.

20. The method of claim 18, further comprising:
inserting the sensor device into a gas flow channel; and
mechanically coupling the mounting plate to the gas flow channel.

* * * * *